United States Patent [19]

Tse

[11] Patent Number: 4,552,776

[45] Date of Patent: Nov. 12, 1985

[54] PROCESS FOR PREPARATION OF TEA COLOR CONCENTRATE AND PRODUCT

[75] Inventor: Hing-Cheung Tse, Fairfield, Ohio

[73] Assignee: The Procter & Gamble Company, Cincinnati, Ohio

[21] Appl. No.: 685,095

[22] Filed: Dec. 21, 1984

Related U.S. Application Data

[63] Continuation-in-part of Ser. No. 509,267, Jun. 29, 1983, abandoned.

[51] Int. Cl.$^4$ ............................................. A23F 3/30
[52] U.S. Cl. ................................... 426/597; 426/533; 426/540
[58] Field of Search ..................... 426/533, 540, 597

[56] References Cited

U.S. PATENT DOCUMENTS 4,440,796  4/1984  Lunder et al. .................... 426/597

*Primary Examiner*—Joseph Golian
*Attorney, Agent, or Firm*—Nancy S. Mayer; Rose Ann Dabek; Richard C. Witte

[57] ABSTRACT

The present invention comprises a process for preparation of tea concentrate with enhanced natural color and the products prepared thereby. Tea is employed as a catalyst to reactions generating color formation. The resulting enhanced color of the tea concentrate and the tea products and beverages prepared therefrom is storage-stable. The process comprises heating a solution of sugar and acid to effect caramelization reactions, followed by adding tea solids and heating to a higher temperature to catalyze Maillard reactions.

17 Claims, No Drawings

PROCESS FOR PREPARATION OF TEA COLOR CONCENTRATE AND PRODUCT

This is a continuation-in-part of application Ser. No. 509,267, filed June 29, 1983, now abandoned.

TECHNICAL FIELD

This invention relates to tea concentrate with enhanced color and a process for its preparation.

BACKGROUND OF THE INVENTION

Sugar-sweetened soluble tea mix products frequently contain 90% or more sugar in granular, colorless form. As a result, many prior art sweetened tea mixes have difficulty presenting a color which is deep and dark enough to be reminiscent of instant tea or black tea. Providing such a color is important because rich, dark brown granules suggest to the consumer that the tea mix will have a strong tea flavor impact. In addition, a deep, red-brown brewed tea color in the beverage prepared from the mix is desirable because it indicates a superior tea flavor to the consumer.

Liquid tea mix products are subject to degradation reactions over time between the tea mix components due to the liquid matrix and the high concentration of the components. These reactions result in the development of precipitates. The precipitates result in turbidity in both the product, and the beverage prepared therefrom, which adversely affects product color.

U.S. Pat. No. 4,440,796 of Lunder et al., issued Apr. 3, 1984, discloses a process for the production of a cold soluble powdered tea extract. Water, tea solids, sugar, aliphatic carboxylic acid, and an aliphatic carboxylic acid salt are mixed to form a paste which is dried at a temperature of 122° F. (50° C.) to 167° F. (75° C.) and ground to a powder. However, since the mixture is not heated above 167° F. (75° C.), the color may not be developed at all, and clearly is not developed to the extent it would be at higher temperatures. Also, the presence of salt acts to buffer the system, and thus interferes with the color development which depends on the pH of the system.

It is desirable to provide a preferred deep, rich tea color naturally via processing to avoid introducing color additives. This invention is directed to providing such a process.

Accordingly, it is an object of the present invention to provide a process for enhancing tea beverage color naturally without the use of added colors.

It is a further object of the present invention to provide a process for preparing a liquid or granular tea product having a storage-stable color.

It is a further object of the present invention to provide a process for preparing a tea concentrate or coloring aid which is stable in a medium having a low pH and high tannin content.

It is a further object of the present invention to provide a process for preparing a tea concentrate in which tea is employed as a catalyst to enhance the formation of color.

These and other objects of the invention will become obvious from the following descriptions and examples.

DISCLOSURE OF THE INVENTION

The present invention comprises a process for preparation of tea concentrate with enhanced natural color and the products prepared thereby. Tea is employed as a catalyst to reactions generating color. The resulting enhanced color of the tea concentrate and the tea products and beverages prepared therefrom is storage-stable. The process comprises heating a solution of sugar and acid to effect caramelization reactions, followed by adding tea solids and heating to a higher temperature to catalyze Maillard reactions.

DESCRIPTION OF PREFERRED EMBODIMENT

The term "tea beverage" as used herein designates an aqueous solution of tea mix granules, powdered tea, instant tea, or a liquid tea product prepared in such a way as to substantially reproduce the brew, normally called tea, obtained by infusion of tea leaves.

The term "tea product" as used herein includes instant tea mix granules, liquid tea, and other commercially available tea products from which a tea beverage can be prepared.

The term "tea concentrate" is used herein to denote the product of the present process which can be used as a coloring aid in a tea product, or alternatively diluted to prepare a liquid tea product.

This invention provides a tea concentrate of enhanced natural color. The tea concentrate is suitable for coloring a dry instant tea mix product or a liquid tea product. For dry products, the tea concentrate of this invention is applied to the dry ingredients, and provides a tea mix product having rich, dark, brown granules suggestive of strong tea flavor. When the tea concentrate of the present invention is used to enhance the color of liquid tea products, a rich, dark brown color is obtained. A deep, red-brown, brewed tea color is also achieved in tea beverage prepared from the liquid or granular products. The color of conventional tea beverage is readily affected by reduced pH (e.g., addition of lemon juice), becoming pale and yellow in color. Furthermore, precipitates will form and the beverage will become turbid. However, the deep red-brown color of the tea beverage generated by the concentrate of this invention is stable, even if the beverage is quite acidic (pH about 3 or lower) and high in tea tannins. No precipitate of the tea concentrate of this invention forms in the beverage, even when the beverage is chilled for cold consumption (4° C.).

Advantageously, this tea concentrate is made using only natural ingredients. In making the tea concentrate of this invention, a reducing sugar or mixture of reducing sugars is heated with a food-compatible acid in solution. The liquid turns dark in color due to caramelization of the sugars. Following the caramelization step, tea solids are added to the solution with continued heating. The proteins and amino acids in the tea solids react with the reducing sugars in Maillard reactions to produce an even more intense, deep, brownish-red color. The liquid can then be cooled and mixed with sufficient water to render it flowable and pumpable. Any insolubles present are separated by filtering or other suitable means. The filtered concentrate can be added to liquid tea products or plated on granular tea mix ingredients, such as sugar granules and citric acid granules. The resulting liquid or granular tea product is dark brown in color, and the beverage prepared therefrom has a deep red-brown color. The concentrate can also be dried and powdered for dry use or storage. In addition, the concentrate can be diluted with water to prepare a liquid tea product.

The present invention is a process for preparing tea concentrate of enhanced natural color comprising: (a)

heating a solution of one or more reducing sugars and acid to a temperature of from about 220° F. (104° C.) to about 300° F. (149° C.) for about 15 minutes; (b) adding soluble tea solids to the solution and heating the resulting mixture to a temperature of from about 280° F. (138° C.) to about 360° F. (182° C.) for about 30 minutes; (c) adding water to the mixture and maintaining the resulting mixture at a temperature of from about 170° F. (77° C.) to about 210° F. (99° C.) for about 45 minutes; and (d) separating any insolubles to yield a tea concentrate of enhanced color.

RAW MATERIALS

In the practice of this invention, any convenient reducing sugar substrate can be used. The term "reducing sugars" is intended to include those sugars that will reduce Fehling's Solution or similar test liquids in standard tests, such as described in the *Book of Methods, Association of Official Analytical Chemists*. Glucose, fructose, corn syrup, invert sugar syrup, or other reducing sugars, can be used. A convenient and preferred solution of reducing sugars is high fructose corn syrup which contains the reducing sugars glucose and fructose and a minor amount of other saccharides. High fructose corn syrup is available in several solids concentrations, generally around 75%, and several different fructose levels ranging from about 42% to about 90% fructose by weight of the total solids. All are suitable. Preferred are those having a fructose content of from about 42% to about 55% by weight of the total syrup solids.

Food-compatible acids in this invention include any edible organic or inorganic acid, or combinations thereof. Examples of organic acids suitable for use herein include fumaric, citric, malic, adipic, tartaric, acetic, succinic, ascorbic, and the like. Also suitable are inorganic acids such as phosphoric acid, sulfuric acid, hydrochloric acid, and the like. Preferred for use herein is citric acid or phosphoric acid. Certain acids or combination of acids will aid in providing more acceptable flavor. "Food-compatible", when used herein, is intended to describe a material which is safe, non-toxic and effective for its intended use, and presents no unacceptable, disagreeable, or interfering flavor, appearance or texture in the particular formulation in which it is employed.

By the expression "tea solids" is meant the product obtained by extraction of leaf tea. This extraction is generally carried out with water, and the resulting extract may be more or less concentrated, for example, in liquid or paste form, or dried, for example, in powder form. These tea solids may also comprise a greater or lesser amount of the flavor and aroma constituents originally contained in the starting tea materials, constituents which have, for example, been separated from the starting material by stripping prior to extraction of the soluble matter, and have been returned to the final tea solids.

Tea solids have a complex chemical composition which is not yet completely established. Further details can be found by reference to M. A. Bokuchava et al., *CRC Critical Reviews in Science and Nutrition*, 12(4), 303–370 (1980), and G. W. Sanderson et al., "Contribution of Polyphenolic Compounds to the Taste of Tea", in *Phenolic, Sulfur and Nitrogen Compounds in Food Flavors*, G. Charalambous, Ed., and I. Katz, Ed., American Chemical Society, Washington, D.C. (1976), the disclosures of which are fully incorporated herein by reference. It is known that tea solids contain some sugars and other carbohydrates; the solids also contain amino acids and proteins. In general, the term "reducing sugars" is intended to imply reducing sugars extraneous to the tea solids employed.

"Browning reactions" are a complex series of chemical reactions, involving primarily, but not exclusively, reducing sugars and amino compounds as starting materials. Details of the chemistry of these reactions can be found in comprehensive review articles on the subjects, including J. P. Danehy et al., *Advances in Food Research*, 3, 241–290 (1951), and J. E. Hodge, *J. Agri. Food Chem.*, 1, 928–943 (1953), both of which are hereby incorporated herein in their entirety by reference. The term as used herein is intended to include Strecker degradation reactions as well.

While some browning reactions can occur at temperatures as low as 86° F. (30° C.), depending upon pH and pressure, the reaction series goes to completion (formation of melanoidins) at temperatures above about 302° F. (150° C.). At temperatures above 446° F. (230° C.), the melanoidins become black, bitter and insoluble, so that temperatures above about 392° F. (200° C.) are preferably avoided. The reaction products which contribute to color include the reaction intermediates between the starting materials and the final product compounds.

PROCESS

The process of the present invention can be performed in single batches, as a continuous process, as a multiple vessel process, or as a combination of the above. In the first step of the process of the present invention one or more reducing sugars and acid are combined and heated to a temperature of from about 220° F. (104° C.) to about 300° F. (149° C.). This can be accomplished in a slurry tank, steam jacketed kettle with means for agitation, or other appropriate equipment known in the art. The mixture is maintained at the temperature indicated for about 15 minutes, preferably with agitation or stirring.

The ratio of acid to sugars employed ranges from about 0.5:1.0 to about 1:5. Preferably, the ratio is from about 1:1 to about 1:2 when an organic acid is employed, and from about 1:3 to about 1:4 when an inorganic acid is employed.

The sugar and acid undergo caramelization reactions. Glucose or fructose will undergo browning in the presence of acid at different rates for different acids. It is known that malic acid gives more color than citric or tartaric acids. The main caramelization reactions which occur between the sugar and acid are 1,2-enolization, sugar dehydration to furfurals, and sugar fission. The extent of the reactions are temperature and pH dependent.

The mixture can then optionally be cooled to a temperature of from about 210° F. (99° C.) to about 250° F. (121° C.). This aids in preventing any disruptive boiling or flashing of moisture when the solution of tea solids is added. Cooling can be achieved by jacketing the kettle with cold water or brine, or by other suitable equivalents means known in the art.

The second step of the process of the present invention comprises adding soluble tea solids to the solution and heating the resulting mixture to a temperature of from about 280° F. (138° C.) to about 360° F. (182° C.). The mixture is maintained at this temperature range for about 30 minutes, preferably with agitation. The tea solids contain protein and amino acids which provide a source of nitrogen. In this manner tea acts as a catalyst for Maillard browning reactions. Sugars and amino acids yield materials dark in color when heated together. These materials are usually referred to as melanoidins. The nature of the reaction is complex and specific reaction products cannot be detailed. Tea aroma components volatilized can be collected, condensed, and added back at a later point in the process.

After these browning reactions the mixture can optionally be cooled to a temperature of from about 210° F. (99° C.) to about 250° F. (121° C.). Cooling the mixture prior to addition of the water aids in prevention of boiling and flash evaporation. Cooling can be achieved as previously described.

In the third step of the process of the present invention water is added to the reaction mixture. Preferably, the water is deionized or distilled. The addition of the water prevents the mixture from solidifying upon cooling. After addition of the water the resulting mixture is maintained at a temperaure of from about 170° F. (77° C.) to about 210° F. (99° C.) for about 45 minutes. Water is added in an amount such that the ratio of water to reducing sugars is from about 1:3 to about 3:1.

The final step of the process of the present invention comprises separation of any insolubles from the heated mixture. Separation can be achieved by any suitable means, such as filtration, centrifugation, or other equivalent means. The filtered tea concentrate obtained has an enhanced deep brown color. The concentrate can be combined with a granular or liquid tea product to enhance their respective colors. The pH of the tea concentrate is typically from about 1.5 to about 3.0. If desired, the tea concentrate can be cooled, dried, and pulverized. Alternatively, the tea concentrate instead of use as a coloring aid can be diluted with additional water to prepare a liquid tea product.

Variations in this manufacturing process can be practiced. For example, fresh tea extract or a solution of fresh tea solids can be used, rather than conventionally processed, spray-dried instant tea powder. Ammonium salts, such as ammonium citrate, can be added with the tea extract to further accelerate the color development.

The color of the tea concentrate of this invention can be described and measured in terms of the Hunter Color system. The Hunter Color system is a well-known means of defining the color of a given material. A complete technical description of the system can be found in an article by R. S. Hunter, "Photoelectric Color Difference Meter," *Journal of the Optical Society of America*, 48, 985-95 (1958).

Basically, the Hunter Color system can be described in terms of a three-dimensional color solid. This solid contains all possible colors and has three perpendicular axes passing through its geometric center. The location of any point within the figure can be determined by reference to its coordinates on the three axes. Therefore, any color can be defined in terms of the three coordinates.

In the Hunter color system the "L" scale contains 100 equal units of division. Absolute black is at the bottom of the scale (L=0) and absolute white is at the top of the scale (L=100). Thus, in measuring Hunter color values the lower the "L" scale value the darker the color. In the Hunter color system the "a" scale measures color hue and chroma between red and green. The "b" scale measures color hue and chroma between blue and yellow. Hue is analogous to the dominant wavelength, while chroma relates to the color purity.

The use of the Hunter color system provides an accurate and reproducible means of color measurement. Techniques have been developed which permits the use of this color measurement system on materials of practically all shapes, sizes and compositions. Devices specifically designed for the measurement of color on the Hunter color scales are described in U.S. Pat. No. 3,003,388 to Hunter et al., issued Oct. 10, 1961, now expired. To measure the Hunter color of the tea concentrate of this invention, a standard preparation of the tea concentrate is made by dissolving 0.1 gm. of the tea concentrate in distilled water in a volumetric flask, and diluting to exactly 0.1 gm. in 100 ml. solution. This standard solution is shaken well before any color measurements.

The Hunter color of the tea concentrate of this invention, when measured on a standard sample as prepared above, will have the following Hunter color values:

L—from about 75 to about 85
a—from about 0.2 to about 3.0
b—from about 25 to about 35.

Tinctorial power is a generally accepted measure of the coloring power of coloring materials. It is defined as the absorbance of the material at a wavelength of 560 nm. The tinctorial power of the tea concentrate of this invention is measured by placing the 0.1% (weight/volume) solution as prepared above in a cuvette (1.0 cm.) and measuring the absorbance at 560 nm. ($A_{560}$) with a spectrophotometer, such as a Spectronic 21 (Bausch & Lomb).

The tinctorial power of the the tea concentrate of this invention is in the range of from about 0.100 to about 0.500.

The hue index of the tea concentrate of this invention is determined, similarly to the tinctorial power, by measuring absorbance of the 0.1% (weight/volume) standard solution at 510 nm. and 610 nm. ($A_{510}$ and $A_{610}$) using a spectrophotometer.

$$\text{Hue index} = 10 \log \frac{A_{510}}{A_{610}}$$

The hue index of the tea concentrate of this invention is in the range of from about 3.0 to about 9.0.

It will be appreciated that the tea concentrate of this invention can also be used to impart its desirable color to other beverages, such as leaf and instant tea, soft drinks and soft drink mixes, both carbonated and noncarbonated, and to foods, such as icings, coatings, candies, etc.

The following Examples illustrate the practice of this invention, without intending to be limitative thereof. All percentages are by weight unless otherwise indicated.

EXAMPLE 1

Example 1 demonstrates the process of the present invention using an inorganic acid. 1035 grams of high fructose corn syrup containing 55% fructose by weight of the syrup solids were placed in a 6 quart cooking pot. 250 grams of concentrated (75%) phosphoric acid were added slowly to the high fructose corn syrup with slow stirring. The mixture was heated to 260° F. 15 minutes. Then it was cooled to 240° F. and a tea solution containing 30 grams of soluble tea and 50 ml. of hot distilled water was added to the cooled mixture. The resulting mixture was heated to 320° F. for 30 minutes. The mixture was cooled to 240° F. and 1000 ml. of hot distilled water were added. Heating was resumed and the temperature was maintained at 180° F. for 45 minutes. Then the liquid was filtered to yield a tea concentrate of deep dark brown color. To demonstrate the stability of the concentrate it was added to a tea beverage prepared from granular tea mix product at a level of 0.2% by weight. The beverage remained clear and retained its deep color with no formation of precipitates for a period of 4 days.

EXAMPLE 2

Example 2 demonstrates the process of the present invention using an organic acid and that the color of the tea concentrate is stable in the presence of acid and tea tannins. 1035 grams of high fructose corn syrup containing 55% fructose by weight of the syrup solids were placed in a 6 quart cooking pot. 500 grams of anhydrous citric acid were dissolved in the high fructose corn syrup. The mixture was heated to 260° F. for 15 minutes with stirring. The liquid was cooled to 240° F. and a tea solution, containing 30 grams of soluble tea and 50 ml. of hot distilled water, was added to the liquid. While stirring continued, the mixture was heated to 320° F. for 30 minutes. Then it was again cooled to 240° F. 1000 ml. hot distilled water were added. The mixture was heated with stirring and held at 180° F. for 45 minutes. The hot solution was filtered to yield a tea concentrate deep brown color. A solution of 0.1% (weight/volume) of the concentrate in distilled water was prepared and measured for tinctorial power and hue index as previously described, using a Spectronic 21 spectrophotometer available from Bausch & Lomb, Rochester, N.Y. The concentrate had a tinctorial power of 0.166 and a hue index of 4.5. The Hunter color was measured as previously described, using a Gardner Colorimeter Model XL-835 available from Gardner Laboratory Division of Pacific Scientific at Bethesda, Md., and was L=83.0, a=0.6, and b=29.6. A solution was prepared of 0.32% citric acid and 0.20% tea concentrate in water and stored for 48 hours. A second water solution containing 0.32% citric acid, 0.20% tea concentrate, 0.25% tea solids, and 10% sugar, was prepared and stored for 48 hours. Both solutions retained their original color, and remained clear with no precipitation.

EXAMPLE 3

Example 3 demonstrates that tea acts as a catalyst for browning reactions.

Two hundred and fifty grams of citric acid and 519 grams of high fructose corn syrup containing 55% fructose by weight of the syrup solids were each added to two separate kettles A and B and heated to 240° F. (116° C.) for 15 minutes with continuous agitation. The mixtures were then cooled to 220° F. (104° C.) for 2 minutes. To kettle A, 15 grams of soluble tea dissolved in 50 ml. of hot distilled water were added. To kettle B, 50 ml. of hot distilled water were added. The mixtures were each heated to 305° F. (152° C.) and maintained for 30 minutes. The mixtures were then cooled to 220° F. (104° C.) and 500 ml. of hot distilled water added to each. The resulting mixtures were each slowly agitated and maintained at a temperature of 180° F. (82° C.) to 200° F. (93° C.) for 45 minutes. Any insolubles were removed from each by filtering to yield tea concentrates A and B.

The pH of concentrate A was 1.90 and that of concentrate B was 1.73. A solution of 0.1% (weight/volume) of each concentrate in water was measured for tinctorial power as previously described, using a Spectronic 21 spectrophotometer available from Bausch & Lomb, Rochester, N.Y. Concentrate A had a tinctorial power of 0.216 while concentrate B had a tinctorial power of 0.122. The hue index for each was measured as previously described, using the same instrument as for the tinctorial power measurements. Concentrate A had a hue index of 4.8, and concentrate B had a hue index of 3.9. Thus, concentrate A was much darker in color indicating that the tea solids acted to catalyze the browning reactions.

Fifty grams of citric acid, 104 grams of high fructose corn syrup containing 55% fructose by weight of the syrup solids, 3 grams of soluble tea, and 110 grams of distilled water were mixed together until all the tea and acid were dissolved. A solution was prepared of 0.1 gram of the resulting mixture in 100 ml. distilled water. This solution was clear and had a tinctorial power of 0. Thus, without the heating steps of the claimed process, tea solids do not contribute to color.

What is claimed is:

1. A process for preparation of a tea concentrate of enhanced color and having a pH of about 1.5 to about 3.0 comprising:
   (a) heating a solution of one or more reducing sugars and acid to a temperature of from about 220° F. (104° C.) to about 300° F. (149° C.) for about 15 minutes, the ratio of acid to reducing sugar is from about 1:0.5 to about 1:5;
   (b) adding soluble tea solids to the solution and heating the resulting mixture to a temperature of from about 280° F. (138° C.) to about 360° F. (182° C.) for about 30 minutes, the ratio of tea solids to reducing sugars is from about 1:6 to about 1:75;
   (c) adding water to the mixture and maintaining the resulting mixture at a temperature of from about 170° F. (77° C.) to about 210° F. (99° C.) for about 45 minutes, the ratio of water to reducing sugars is from about 1:3 to about 3:1; and
   (d) separating any insolubles to yield a tea concentrate of enhanced color.

2. The process of claim 1 wherein the acid comprises citric acid or phosphoric acid.

3. The process of claim 1 wherein the reducing sugars comprise high fructose corn syrup.

4. The process of claim 1 further comprising cooling the solution of step (a) to a temperature of from about 210° F. (99° C.) to about 250° F. (121° C.) prior to adding the tea solids.

5. The process of claim 1 wherein the water comprises distilled or deionized water.

6. The process of claim 1 further comprising cooling the mixture of step (b) to a temperature of from about 210° F. (99° C.) to about 250° F. (121° C.) prior to adding the water.

7. The process of claim 1 wherein the separation is by means of filtration.

8. The process of claim 1 wherein the tea concentrate has a tinctorial power of from about 0.10 to about 0.50.

9. The process of claim 1 wherein the tea concentrate has a hue index of from about 3.0 to about 9.0.

10. The process of claim 1 wherein the tea concentrate has a Hunter "L" value of from about 75 to about 85, a Hunter "a" value of from about 0.2 to about 2.0, and a Hunter "b" value of from about 25 to about 35.

11. A process for enhancing tea color comprising:
(a) heating a solution of high fructose corn syrup and edible acid in a ratio of from about 1:0.5 to about 1:5 to a temperature of from about 220° F. (104° C.) to about 300° F. (149° C.) for about 15 minutes;
(b) cooling the solution of step (a) to a temperature of from about 210° F. (99° C.) to about 250° F. (121° C.) for about 15 minutes;
(c) adding soluble tea solids to the solution in a ratio to the reducing sugars of from about 1:6 to about 1:75 heating the resulting mixture to a temperature of from about 280° F. (138° C.) to about 360° F. (182° C.) for about 30 minutes;
(d) cooling the mixture of step (b) to a temperature of from about 210° F. (99° C.) to about 250° F. (121° C.);
(e) adding water to the mixture in a ratio to the reducing sugars of from about 1:3 to about 3:1, and maintining the resulting mixture at a temperature of from about 170° F. (77° C.) to about 210° F. (99° C.) with agitation for about 45 minutes; and
(f) separating any insolubles to yield a tea concentrate having a pH of from about 1.5 to about 3.0, a hue index of from about 3.0 to about 9.0, and a tinctorial power of from about 0.10 to about 0.50.

12. The process of claim 1 wherein the tea concentrate of step (d) is dried and pulverized prior to addition to the tea mix.

13. The process of claim 1 wherein the tea concentrate of step (d) is diluted with water to yield a liquid tea product suitable for preparation of a tea beverage.

14. The product prepared according to claim 1.

15. The product prepared according to claim 11.

16. The product prepared according to claim 12.

17. The product prepared according to claim 13.

* * * * *